United States Patent

Green et al.

[15] 3,661,540

[45] May 9, 1972

[54] AUXILIARY EQUIPMENT FOR BLENDING

[72] Inventors: Warren E. Green, Baton Rouge; George H. Perry, Greenwell Springs, both of La.

[73] Assignee: Ethyl Corporation, New York City, N.Y.

[22] Filed: Mar. 16, 1970

[21] Appl. No.: 19,971

Related U.S. Application Data

[63] Continuation-in-part of Ser. No. 614,469, Feb. 7, 1967, abandoned.

[52] U.S. Cl. .................................... 44/2, 73/35, 137/88, 137/93, 235/132

[51] Int. Cl. ............................................... C10l 1/04

[58] Field of Search .................. 44/2; 73/35; 208/17; 137/93, 137/88; 235/132 E

[56] References Cited

UNITED STATES PATENTS

| | | | |
|---|---|---|---|
| 2,903,417 | 9/1959 | Beaugh et al. | 208/136 |
| 3,000,812 | 9/1961 | Boyd | 208/138 |
| 3,238,765 | 3/1966 | Beal | 73/35 |
| 3,312,102 | 4/1967 | Traver | 73/35 |
| 3,383,904 | 5/1968 | Jones et al. | 73/35 |
| 3,437,461 | 4/1969 | Hoffman et al. | 44/2 |

*Primary Examiner*—Patrick P. Garvin
*Attorney*—Donald L. Johnson, John F. Sieberth and Arthur G. Connolly

[57] ABSTRACT

Apparatus for monitoring and controlling blending as in gasoline manufacture, with computing and display units to show Research and Motor Octane Numbers, Road Index, and accumulated octane barrels by which blended stream departs from target. Signals from test engine give octane deviation which are added to adjustable reference signal to give Octane Numbers. Octane deviation signals are also multiplied by stream flow rate signals and integrated to give accumulated net that can be shown on properly sensed digital display.

10 Claims, 2 Drawing Figures

AUXILIARY EQUIPMENT FOR BLENDING

This application is a continuation-in-part of our prior co-pending application Ser. No. 614,469, filed Feb. 7, 1967 (subsequently abandoned).

The present invention relates to equipment suitable for use in assisting with the blending of gasoline for example. Such blending equipment is described in prior applications Ser. No. 205,015 filed June 25, 1962 (now U.S. Pat. No. 3,383,904 granted May 21, 1968); Ser. No. 299,583 filed Aug. 2, 1963 (now abandoned); Ser. No. 377,192 filed June 23, 1964; and Ser. No. 577,560 filed Aug. 9, 1966 now U.S. Pat. No. 3,488,168 granted Jan. 6, 1970.

Among the objects of the present invention is the provision of auxiliary equipment that conveniently displays key characteristics of a stream of gasoline or the like, and assists with the blending of the stream.

Figure 1:
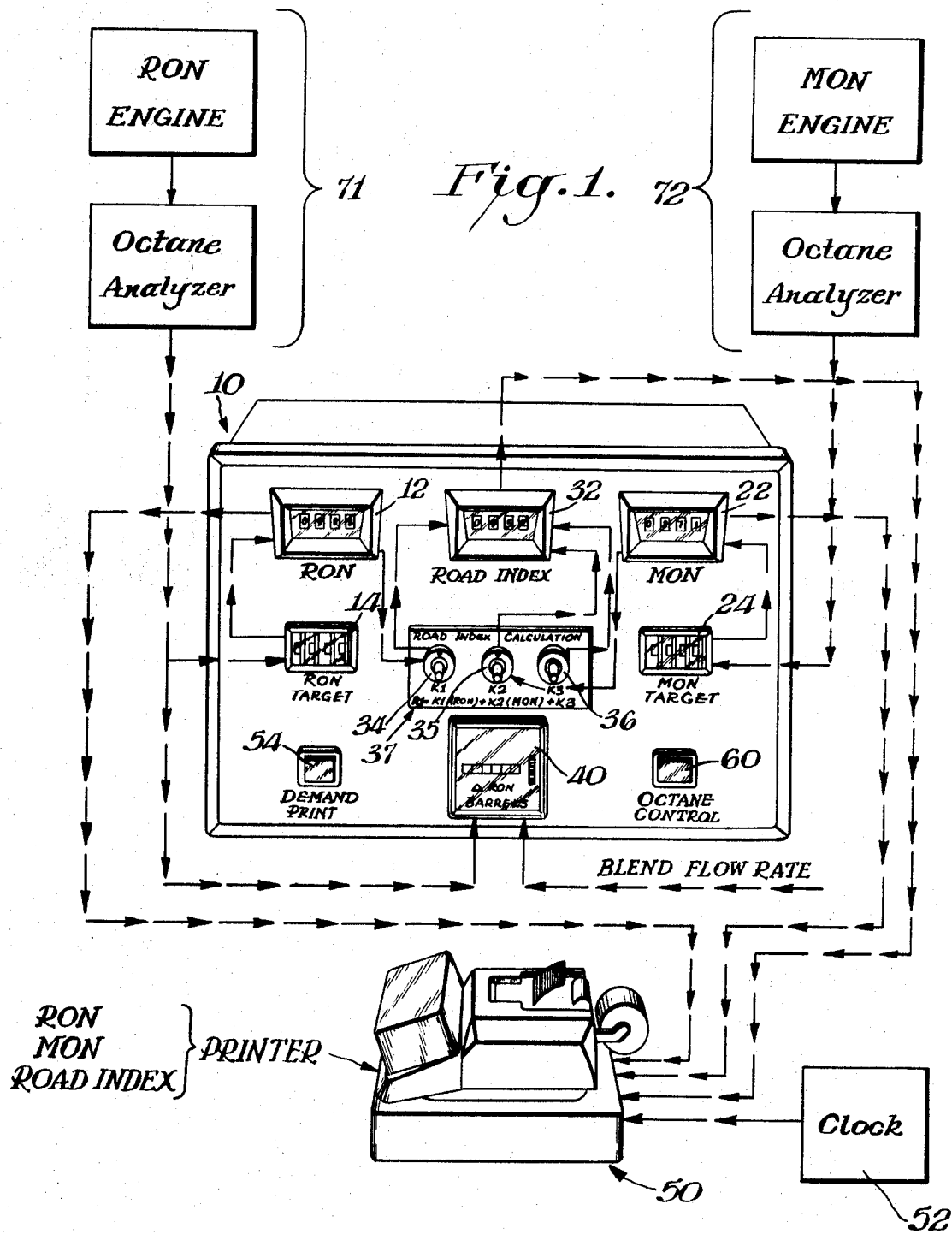
Figure 2:
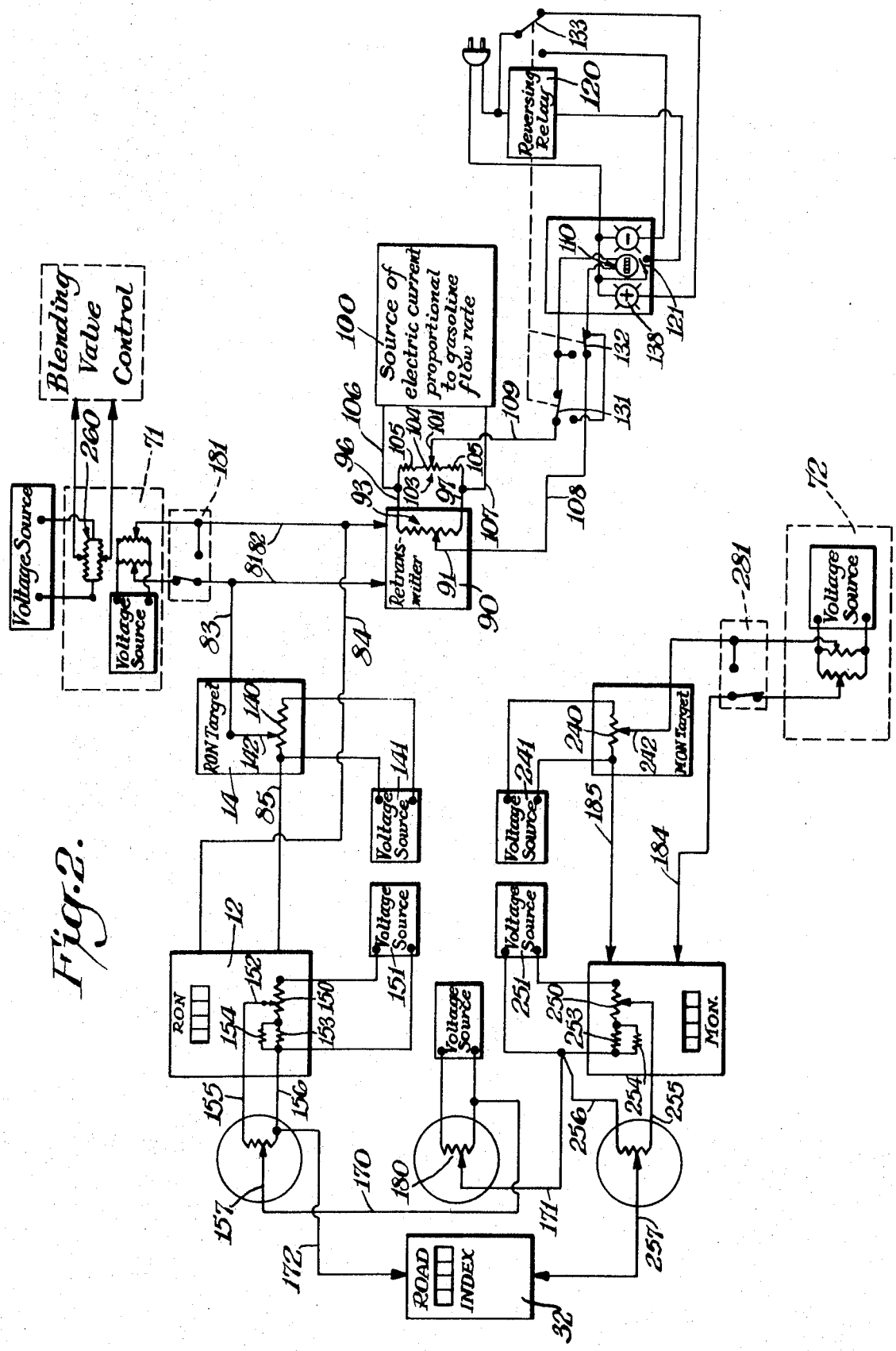

The foregoing as well as additional objects of the present invention will be more fully understood from the following description of several of its exemplifications, reference being made to the accompanying drawings wherein:

FIG. 1 is a pictorial representation of a monitoring and display apparatus representative of the present invention, with its operative connections shown diagrammatically; and FIG. 2 is a circuit diagram suitable for use in the apparatus of FIG. 1.

According to the present invention there is provided a display of the number of accumulated octane barrels by which a gasoline stream departs from a desired octane target, the display having a motor that operates in accordance with the magnitude and sense of an electrical signal, a totalizer connected to display the net number of revolutions of the motor in one direction, multiplying means connected to deliver to the motor an electrical signal corresponding to the product of gasoline stream flow and octane number deviation from target, and reversing elements connected to reverse the sense of the signals supplied to the motor when the totalizer attempts to go below zero. The totalizer is preferably a digital display totalizer and the reversing elements include a visual display showing whether the displayed digits represent plus or minus deviation from target.

Such a display integrator with sense reversal is also of general utility and need not be restricted to blending monitors for gasoline.

Another feature of the present invention is an octane rating display having a signal supply for receiving a signal indicating the deviation from target, adjustable reference structure connected to add to the signal a selectable value corresponding to the target value, and display elements connected to display the resulting sum. The deviation signal can be derived from a test engine connected to supply a signal representative of the intensity of knock developed when operated by the gasoline being checked.

The apparatus is preferably further connected to control the blending into gasoline of an octane adjusting ingredient so as to automatically compensate for deviations from target.

Both Research and Motor Octane Numbers can be displayed in the above-described manner, and the Octane Numbers can be further used to automatically calculate and display a Road Index value for the gasoline. The displays of Octane Numbers and Road Index can also be combined with an octane barrel deviation display such as mentioned earlier.

Turning now to the drawings, FIG. 1 shows a display assembly mounted in a housing 10. The assembly includes (a) a Research Octane Number indicator 12 for such measured numbers; (b) a Research Octane Number Target indicator 14 to represent a predetermined Research Octane Number desired in the gasoline being tested; (c) a Motor Octane Number indicator 22 for measured Motor Octane Numbers; (d) a Motor Octane Number target indicator 24 for the Motor Octane Number desired; (e) a Road Index indicator 32 to give the Road Index value of the gasoline being tested, as computed from the measured Research and Motor Octane Numbers; and (f) an octane-barrel indicator 40 to show the accumulated deviation of the gasoline from the desired target value.

Also displayed is a set of adjustable selectors 34, 35 and 36 used for setting constants that determine how the Road Index is computed from the Research and Motor Octane Numbers. The computing formula is also shown at 37.

The apparatus of FIG. 1 also includes a printer 50 connected to print such indications as the Octane Number and the Road Index. The printer can be connected to a clock 52 so that any or all of the indications are automatically printed at predetermined intervals. An extra control shown as demand print button 54 is also provided for actuating the printer when it is not feasible to wait for the next clock-timed printing. Another control button 60 can be used to connect the apparatus as an automatic blending control.

The display apparatus of FIG. 1 is shown as connected to two separate octane testing units 71, 72 separately arranged to provide electrical signals representing Research and Octane Numbers, respectively. The testing units can be in the form shown in prior applications Ser. No. 377,192 or Ser. No. 577,560, and the contents of these applications are incorporated herein as though fully set forth herewith. The signals are supplied to the various portions of the display apparatus, as indicated by the lines of arrows.

FIG. 2 more fully shows the electrical interconnections. In this embodiment of the invention, test unit 71 supplies to leads 81, 82 an electrical voltage proportional to the deviation of the Octane Number of the tested gasoline from the target value. This signal need be nothing more than a voltage derived in accordance with the variations of knock intensity in a test engine that is set to produce a standard knock intensity with gasoline having the target Octane Number.

The deviation voltage between leads 81, 82 is supplied to retransmitter 90 which is arranged to automatically position a movable terminal 91 of a potentiometer 93 in accordance with the deviation signals. Bridged across potentiometer 93 is another variable resistance 103 also having a movable arm 101. Applied to leads 96, 97 connecting the bridging terminals of the potentiometer 93 and variable resistance 103, is an electric current supplied by source 100 through leads 106, 107. The electric current so supplied is arranged to be proportional to the gasoline flow rate in a blender, for example as by a frequency to current converter which receives the usual pulse signals of a flow rate indicator, and supplies an electric current proportional to the pulse repetition rate. A suitable converter for this purpose is described in Foxboro Company Handbook of Instructions for Frequency-to-Current Converter, Model FR-316 dated Apr. 15, 1965.

As so arranged there will be developed between movable arms 91 and 101 of the bridged resistances, an electrical potential corresponding to the product of the gasoline flow rate and the Octane Number, if arm 101 is fixed in a position which exactly corresponds to the position of arm 91 when the deviation is zero. This electrical product is delivered through leads 108, 109 to a digital integrator 110. Such as integrator need be nothing more than an electric motor driven by the voltage in one direction or the other, depending upon the magnitude and sense of the multiplied signals, and arranged so that the total number of revolutions of the motor are shown in the indicator window.

Integrators of this type have some awkward features, particularly in that it is difficult to work with the indications they give when the integrated value falls below zero. An ordinary counter, such as is conventionally use and which counts as high as 100,000, will when going below zero, show numbers from 99,999 down, depending upon how far the indicated value gets below zero. With a large excursion below zero, it not only is difficult to read the value represented by such a large number, but serious departures of the integrated value from zero can be confused in that they can be read as a departure above or below zero. For example, anyone seeing a 50,000 reading on a 100,000 count integrator might not be able to determine whether this represents an octane barrel deviation above normal, or one below normal.

According to the present invention the integrator is provided with an automatic reversing arrangement shown as including a step-type reversing relay 120 triggered by a switch 121 that is closed whenever the counter tries to go below zero. Reversing relay actuates armatures 131, 132 and 133, these armatures being shown in the position they occupy before any reversal. In this condition the integrator motor is connected through switches 131, 132 to rotate in the counter-increasing direction when the polarity of the deviation signals corresponds to deviations in the high octane direction. This sense is indicated by switch 133 which closes an energizing circuit for a + light 138. The integrator's reading is then understood to be that many octane barrels above target.

When there is an octane deviation below target, the indicator will turn backwards. Should the low octane situation persist the integrator will reach zero. If it attempts to turn backwards even further, it will close switch 121, causing it to energize the reversing relay 120 and step it to its next position. Such step moves all three switches 131, 132, 133 to their opposite condition. In this opposite condition switches 131, 132 reverse the sense of the voltage applied to the integrator motor, and switch 133 causes the + light to go out and the − light to go on. The integrator motor will now begin to turn in the count-increasing direction and will continue to do so so long as the low octane deviation is not corrected. The reading will then be understood to be that many octane barrels below target.

When the low octane deviation becomes corrected, the integrator will stop increasing its count, and an increase in octane number will then reverse the deviation and cause the integrator to count backwards. This backward count will continue until the counter reaches zero again and any further attempt to count backwards will trip the reversing relay 120 once more, restoring the integrator to its original condition in which it increases its count to show an octane barrel deviation above target.

The foregoing operation of integrator 110 can also be effected if the integrator is of the radial type having a pointer that rotates around a dial. With a radial integrator counter it is also possible to provide its dial with a zero point midway of its scale so that the pointer will indicate high octane barrels on the scale on one side of zero and low octane barrels on the scale on the other side of zero. However, this effectively reduces the amount of scale available for total count. Radial counters are also not easy to read as accurately as digital counters.

In the construction of FIG. 2 Research Octane Number deviation signals are supplied from testing unit 71 to leads 83, 84 and through these leads operates the Research Octane Number indicator 12. To this end lead 84 runs directly to the indicator 12, but lead 83 runs to the Research Octane Number target indicator 14 where there is added to the signal a differential signal from potentiometer 140, and the sum of the two signals ten delivered to Research Octane Number indicator 12. An additional lead 85 is provided for this purpose. The differential signal is provided at potentiometer 140 by means of a voltage source 141 and an adjustable tap 142 which is set to fix the differential signal to a value corresponding to the octane number. This value can be set on the face of the Research Octane Number target indicator 14, as shown in FIG. 1.

The potentiometer 140 can be a voltage divider with digital contacts operated by a digital-type counter so that the setting of the counter will automatically position the tap 142 with the right contact. The voltage source 141 is arranged to provide a voltage which bears the same relation to the target values as the deviation signals bear with respect to the octane deviation values so that the addition of these two voltages can then be measured to indicate the Octane Number itself.

Research Octane Number indicator 12 can merely be a digital voltmeter that displays a voltage corresponding to that appearing between leads 84, 85. In addition to such display, the voltmeter can also have the counter arranged to retransmit a voltage proportional to the Research Octane Number so that the retransmitted voltage can be used for computing the Road Index value. As shown, a separate potentiometer 150 supplied by an independent voltage source 151 has a movable tap 152 automatically positioned as by the counter of the digital voltmeter. In as much as there is no need for measuring Octane Numbers that are extremely low, as for example 20 or lower, and there is a need to measure octane values above 100, counter 12 can be offset so that a zero voltage is indicated as an Octane Number of 20, and the maximum voltage measured is indicated as an Octane Number of 120. With this arrangement it is desirable to add an offset resistor 153 in series with potentiometer 150, so that when this potentiometer is moved to its low end by an Octane Number of 20, the voltage retransmitted also corresponds to 20 rather than to zero. Greater accuracy in fixing the retransmitted output voltage may be provided by an adjusting resistor 154 in parallel with offsetting resistor 153. The retransmitted voltage then appears across leads 155, 156 and a selectable fraction of this voltage is taken off by tap 157 operated by selector knob 34.

The Motor Octane Number target display and the Motor Octane Number indicator are arranged in a manner essentially duplicating that of the corresponding Research Octane Number components and are similarly numbered with reference characters exactly 100 higher. A take-off lead 257 controlled by selector knob 35 provides a corresponding fraction of the voltage that represents the Motor Octane Number. Leads 170, 171, 172 are connected to add the selected fraction of the Research Octane Number to the selected fraction of the Motor Octane Number and to this also add a voltage selected by means of potentiometer 180, supplying this combined sum to the Road Index indicator 32. This indicator can be another digital voltmeter.

Control of the blending is established by means of an additional pair of self-balancing potentiometers 260, one of which responds to the knock-intensity signals of the Research Octane Number engine of test unit 71 when operating on a standard or reference fuel, and the other of which responds to the knock intensity signals of the test unit 71 when operating on a test fuel. The resulting differential voltage between the potentiometers is applied to electronic or pneumatic controllers which manipulate a blend control valve to bring the octane deviation or differential voltage to zero. This control can also be arranged in any of the other forms described in the above-identified earlier applications. The blending can be controlled from the Motor Octane Number test unit 72, if desired, or even from the Road Index indicator. Also, instead of supplying the electrical signals for the various indicators in accordance with variations of knock intensity, these signals can correspond to changes in compression ratio of the different test units, the units being then arranged to have the compression in their engines automatically varied to keep the knock intensity constant. Such systems are described in the above-identified earlier applications.

One convenient technique for measuring the position of the cylinder head of the engine for the purpose of determining the compression ratio adjustment is by means of a differential transformer. A stationary coil combination can, for example, be held in fixed position secured to the engine block, and a movable high permeability or high loss core secured to the engine cylinder can be arranged for movement with respect to the coil combination to cause an AC signal to be transduced with varying intensity or phase, from one portion of the coil combination to another. It is also helpful to cool the gasoline supplied to the test engines to a temperature of 40° F, for example, and thus materially reduce variations caused by temperature changes.

The construction of FIG. 2 is also shown as provided with relay units 181, 281 connected to automatically short across between leads 81, 82, for example, when the engine in test unit 71 stops operating. So long as the engine does operate, the relay unit opens the short circuit and closes the supply circuit to deliver the deviation signals in the manner described above. This arrangement will keep the Octane Number indicators indicating the target numbers when the engines are not operating, rather than permit them to drop to the lowest octane indication because of the absence of knock-intensity signals or the like. The relay units can also be connected to the printer 50 and cause the printer to print distinguishing indications when their respective engines are not operating.

The test units 71, 72 are preferably arranged to automatically switch the engine operation from test fuel over to prototype, target, and/or reference fuel at regular or irregular intervals which can be very short, to thereby calibrate or check the engine's performance. During such switch-over the knock intensity or compression ratio signals can be simultaneously switched over to adjust the set point of the potentiometer or other element used for the zero position for octane deviation signals, as explained in application Ser. No. 377,192. While it is preferred to use reference or target fuels that have the exact Octane or Road index desired, they can have somewhat different values with the offset corrected electrically. Thus, engine calibration can be carried out with an extra resistor switched in series with the set-point potentiometer, for example, to cause the set point to be controlled by a calibration signal which is suitably offset from the signal supplied by the engine.

The different gasolines or reference fuels can be supplied to the respective engines in such a way that each is carburetted to the fuel-air ratio that gives maximum knock. Inasmuch as the maximum knock ratio is generally different for different gasolines, each engine can have a carburetor with a plurality of different bowls, each bowl having the height of the gasoline in it separately adjustable. The switching of the fuel can then be accomplished by switching from one bowl to another, the bowl switched to being adjusted to supply its particular gasoline under a hydrostatic head that provides the correct fuel-air ratio for maximum knock. Accordingly, once the apparatus is set up for specific gasolines both in the stream being blended and that used for target, prototype or reference fuel, the apparatus will operate in a purely automatic way and perform all calibrations properly.

Should there be a process upset and the blend stream significantly changed in composition, readjustment will be needed for the proper fuel-air ratio of the changed stream. This can be carried out manually since such an upset gives plenty of warning. If desired, however, the fuel-air-ratio adjustment may also be automatic, as described for example in applications Ser. No. 299,583 and Ser. No. 377,192. Such automatic adjustment can be arranged to be carried out periodically, for example at intervals of an hour or longer, so that even process upsets will be taken care of automatically. Alternatively, the automatic fuel-air-ratio adjustment can merely be connected to another control on the housing 10, for instance, and placed in operation whenever desired, at which time it will only make one fuel-air ratio adjustment. In this way it is a simple matter to take care of blending upsets without having to run an off-blend stream for any substantial period of time.

The apparatus of the present invention can also be arranged to automatically detect misoperation of its engines, as by mounting a pressure-responsive switch in a tube that dips into a carburetor bowl. The tube can have its upper portion sealed so that any increase in fuel level builds within the tube a pressure sufficient to close the switch. This switch can then signal an alarm and/or shut off the engine's ignition, or the like, to show that attention is needed. Each carburetor bowl can be equipped with such a pressure-responsive switch, although this arrangement is primarily useful for the bowl that handles the sample of stream blend. The bowls used for target, reference or prototype fuel can have a similar pressure-sensitive switch connected for actuation by a drop in pressure to show that the fuel level is too low, as for example when the supply of calibrating fuel is exhausted and needs replenishment. A drop-in-pressure sensing device can also be used with the stream fuel to indicate a leak or stoppage in the supply line.

Digital Electronic Blending utilizes the concept of integration control — i.e., accumulating the errors of the system and manipulating variables in response to this accumulated error until that error is zero. This same type control scheme can be utilized for control by analyzers where the end product must meet certain overall specifications and where the analyzers can measure the parameters of these specifications.

A particular example is in the preparation of commercial gasoline products where such specifications as Motor Octane Number, Research Octane Number, volatility, vapor pressure and sulphur content can be measured continuously with commercially available equipment. A more explicit example — motor octane — is used to indicate the overall control system as well as the individual equipment requirements.

The purpose of this control is to develop a product whose individual specifications are met regardless of the instantaneous upsets prevalent during the manufacture of the product. In this particular case it is desired to develop a level of motor octane number in a gasoline where the amount of this product is of some predetermined quantity. The instantaneous error developed is not the MON error solely but the instantaneous octane deviation from desired, times the instantaneous rate of production ($\Delta$Motor Octane Barrels). Equipment is provided to develop a signal directed related to this total instantaneous error. This procedure uses convertors to develop compatible signals which are then multiplied in a bridge with electronic or pneumatic multiplier circuits and the resulting signal is integrated (accumulated) mechanically and/or electrically. It is desirable, although not necessary, to provide a means of manually inserting numbers into this accumulator so that initial errors, such as tank heels, could be automatically reduced to zero. It is also desirable though not necessary to provide limit alarms which would be used to actuate alarm or shutdown systems if these limits are exceeded. The accumulator is equipped with a digital to analog conversion network which develops a positive or negative signal (dependent upon the degree and direction of the error) which is the error signal for a conventional electronic amplifier whose output is used to manipulate a valve or set point of another controller which in turn operates to reduce the motor octane barrel error to zero.

The electronic controller(s) or the convertor must be designed to compensate for the process lag in the system, that is the time required for the analyzer to detect a change resulting from manipulation of the desired variable. This is normally accomplished by one of three methods: (1) long reset time in the controller; (2) timer to prevent control changes except after a specified lag time; or (3) small voltage changes per increment of error. These methods can be used individually or collectively.

The octane deviation signals of the present invention are conveniently supplied from differences in octane intensities, or from differences in engine compression where the test engine is arranged to keep knock intensity constant by automatically changing its compression ratio to compensate for knock intensity variations. The automatic engine equipment once set up for a refinery stream will operate with a relatively small departure of octane level from a pre-set reference. Within such small ranges the relationship between octane numbers and knock intensity or between octane numbers and compression ratio or between octane numbers and cylinder head position, can be considered linear so that no complex signal conversion equipment is needed. The knock meter output can accordingly be used as is, the electrical signal related to cylinder height is generated by a differential transformer, for example.

Any large octane shift is generally due to process upset or stock supply failure and calls for prompt action to bring the octane back to reference. This does not happen frequently enough or long enough to be concerned about any non-linearity in signal-to-octane relationship during the shift. When the apparatus is set at any octane reference level, and particularly when reset to a distant octane level it is desirable to adjust the electrical output as with a shut and/or series potentiometer to more closely conform that output to the corresponding octane number variation.

What is claimed is:

1. An apparatus for displaying the number of accumulated octane barrels by which a gasoline stream departs from a desired octane target, said apparatus including a motor that operates in accordance with the magnitude and sense of an electrical signal, a totalizer connected to display the net number of revolutions of the motor in one direction, multiplying means connected to deliver to the motor an electrical signal corresponding to the product of gasoline stream flow and octane number deviation from target, and reversing elements connected to reverse the sense of the signals supplied to the motor when the totalizer attempts to go below zero.

2. The combination of claim 1 in which the totalizer is a digital display totalizer and the reversing elements include a visual display showing the sense of the totalizer's total.

3. A digital display integrator having a motor connected for operation in accordance with the magnitude and sense of an electrical signal to be integrated, and also having reversing elements connected to shift the direction of motor operation with respect to the signal when the motor attempts to reduce the digital display below zero, the reversing elements including a visual display showing the sense of the digital display.

4. A display apparatus for indicating the octane rating of gasoline being tested for deviation from a target octane value, said apparatus having signal supply means for receiving a signal indicating the deviation from target, adjustable reference structure connected to add to the signal a selectable value corresponding to the target value, and display elements connected to display the resulting sum.

5. The combination of claim 4 in which the signal supply means includes a knock testing engine connected to supply a signal representative of the intensity of knock developed by the engine when operated by the gasoline being tested.

6. The combination of claim 4 in which the apparatus is further connected to automatically vary the blending into the gasoline of an octane adjusting ingredient so as to automatically compensate for deviations from target.

7. The combination of claim 4 in which the apparatus has a first signal supply means for receiving a signal indicating the deviation of the gasoline from a Research Octane Number target, and a second signal supply means for receiving a signal indicating the deviation of the gasoline from a Motor Octane Number target, and adjustable reference structure and display elements are connected to separately display both the Research Octane Number and the Motor Octane Number of the gasoline.

8. The combination of claim 7 in which the apparatus is further connected to automatically vary the blending into the gasoline of an octane adjusting ingredient so as to automatically compensate for deviations from target.

9. The combination of claim 7 in which the apparatus further includes a display integrator connected to show the octane barrels deviation from target.

10. An antiknock monitoring apparatus for a stream of blended gasoline said apparatus having a totalizer connected to receive a signal indicative of the rate of gasoline flow in the stream along with a signal from a test engine indicative of the departure of the gasoline from a target antiknock value and integrating the product of these two signals, said apparatus including a relay connected to respond to the stopping of the test engine by shorting the latter signal.

* * * * *